, Jr. et al.

United States Patent [19]
Cheney, Jr. et al.

[11] 4,083,651
[45] Apr. 11, 1978

[54] WIND TURBINE WITH AUTOMATIC PITCH AND YAW CONTROL

[75] Inventors: Marvin Chapin Cheney, Jr., Glastonbury; Petrus A. M. Spierings, Middletown, both of Conn.

[73] Assignee: United Technologies Corporation, Hartford, Conn.

[21] Appl. No.: 715,346

[22] Filed: Aug. 17, 1976

[51] Int. Cl.² ............................................. F03D 7/04
[52] U.S. Cl. .................................... 416/18; 416/139; 416/141
[58] Field of Search ............... 416/18, 139, 41, 117, 416/111, 119, 118, 132 B, 141, 240

[56] References Cited

U.S. PATENT DOCUMENTS

| 2,791,281 | 5/1957 | Boyd | 416/240 X |
| 3,874,816 | 4/1975 | Sweeney et al. | 416/139 |
| 3,880,551 | 4/1975 | Kisovec | 416/141 |
| 3,999,886 | 12/1976 | Ormiston et al. | 416/141 X |
| 4,025,230 | 5/1977 | Kasyan | 416/18 |

FOREIGN PATENT DOCUMENTS

| 510,809 | 5/1952 | Belgium | 416/132 |
| 868,278 | 12/1941 | France | 416/41 |
| 988,883 | 9/1951 | France | 416/142 |
| 179,249 | 3/1966 | U.S.S.R. | 416/139 |

OTHER PUBLICATIONS

Machine Design; vol. 48, No. 12; May 20, 1976, (pp. 18-20, 23-26).

Primary Examiner—Everette A. Powell, Jr.
Attorney, Agent, or Firm—Vernon F. Hauschild

[57] ABSTRACT

A wind turbine having a flexible central beam member supporting aerodynamic blades at opposite ends thereof and fabricated of uni-directional high tensile strength material bonded together into beam form so that the beam is lightweight, and has high tensile strength to carry the blade centrifugal loads, low shear modulus to permit torsional twisting thereof for turbine speed control purposes, and adequate bending stiffness to permit out-of-plane deflection thereof for turbine yard control purposes. A selectively off-set weighted pendulum member is pivotally connected to the turbine and connected to the beam or blade so as to cause torsional twisting thereof in response to centrifugal loading of the pendulum member for turbine speed control purposes.

10 Claims, 12 Drawing Figures

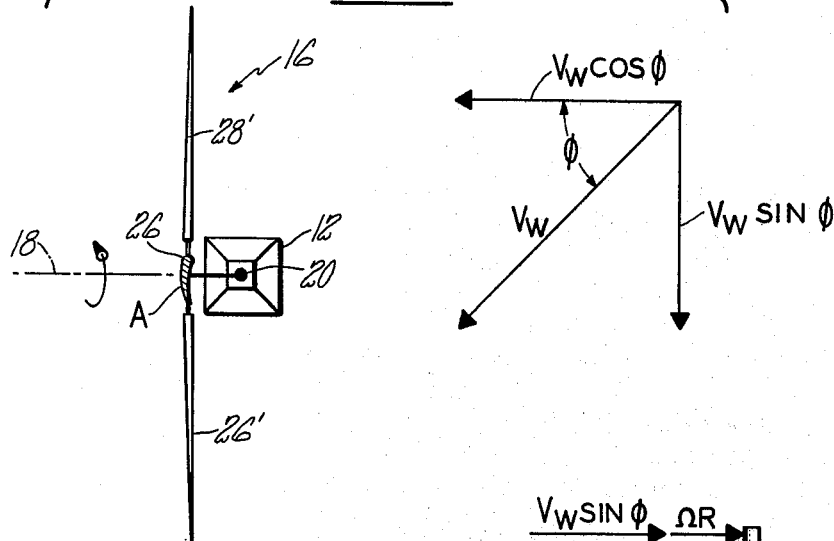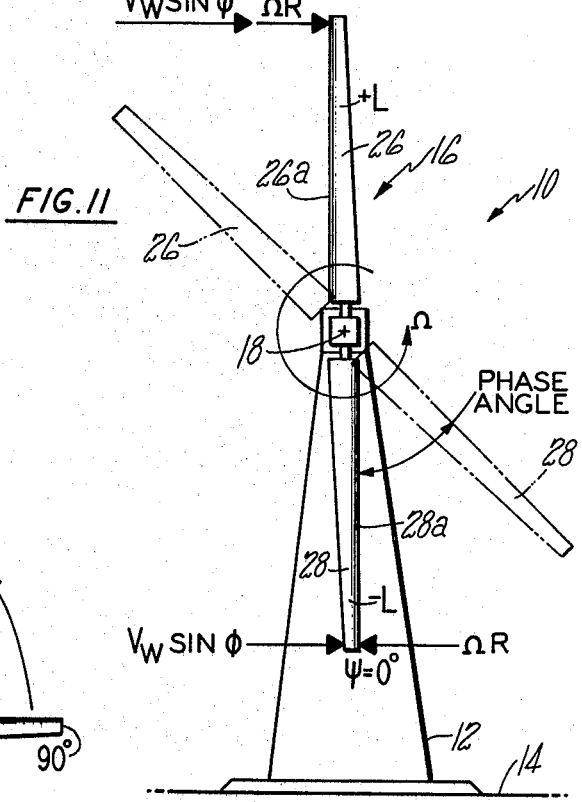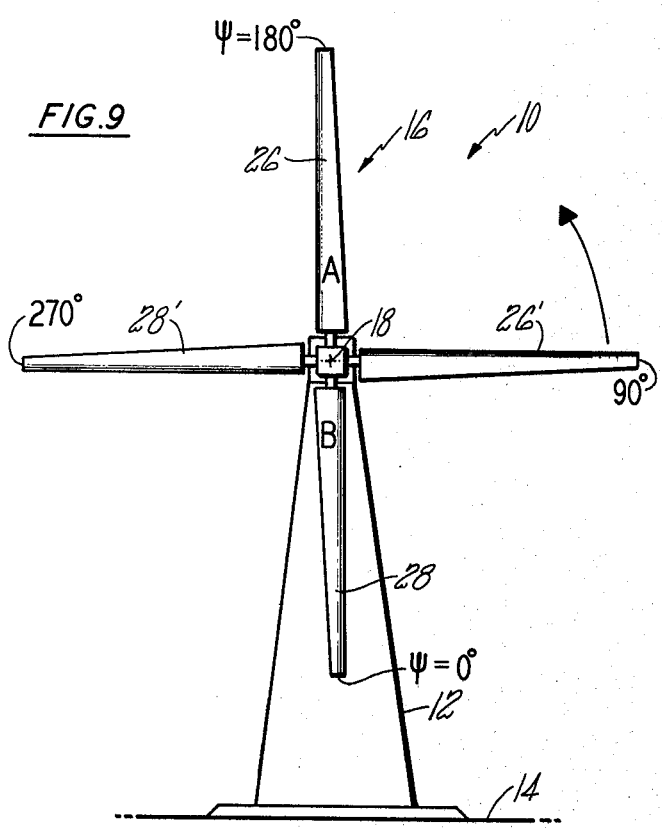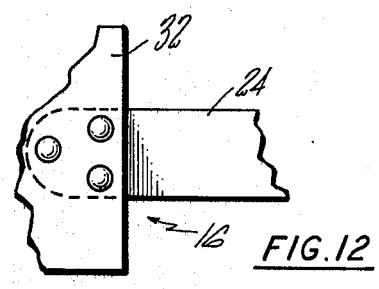

WIND TURBINE WITH AUTOMATIC PITCH AND YAW CONTROL

The invention herein described was made in the course of or under a contract or sub-contract thereunder, with the United States Energy Research and Development Administration.

BACKGROUND OF THE INVENTION

1. Field of the Invention

This invention relates to wind turbines and more particularly to wind turbines fabricated from a central flexible beam member supporting aerodynamic blades at the opposite ends thereof and mounted from support structure for rotation about an axis of rotation and free pivot motion about a yaw axis, and with pitch and yaw control capabilities.

2. Description of the Prior Art

It is common practice in wind turbine art to use the wind resistance of the turbine, preferably aided by a weather vane, for yaw control purposes as in U.S. Pat. No. 1,792,212. It has also been conventional practice in wind turbines to either provide no speed control mechanism or to provide complicated speed control mechanism of the type taught in Weeks U.S. Pat. No. 2,215,413 wherein centrifugally responsive weights serve as an overspeed governor to keep the wind turbine at low rotational speed where it unfortunately suffers poor performance.

Further, wind turbines have had yaw control mechanisms which include a wind directional sensor which sends a wind direction signal to a yaw motor which drives the wind turbine in yaw until the signal is reduced to zero. To avoid high gyroscopic loads generated by the wind turbine during its yaw correcting motion, the wind turbine must be motor driven very slowly in yaw. Yaw correction is therefore slow with such a mechanism so that the efficiency of the system is reduced. Contrary to this yaw motion system, our construction does not have to combat gyroscopic loads but utilizes gyroscopic loads beneficially to achieve yaw control.

SUMMARY OF THE INVENTION

A primary object of the present invention is to provide a wind turbine having a flexible central member supporting aerodynamically shaped blades at the opposite ends thereof and fabricated from bonded, uni-directional high tensile strength fiber members so that the blades are supported from the flexible central member to permit pitch angle and hence speed control of the rotor by torsional twisting of the beam member in response to turbine generated centrifugal force and having sufficient bending flexibility out of the plane of the turbine to impose aerodynamic induced moments upon the turbine for yaw control motion.

In accordance with the present invention, a wind turbine is provided which does not require a heavy and complicated connection between the blade and the hub and which is self-regulating in blade pitch and yaw.

In accordance with the further aspect of the invention, the wind turbine taught herein includes control mechanisms to vary blade pitch and turbine rpm to achieve maximum wind turbine performance.

It is still a further feature of the present invention that the wind turbine is self-starting.

It is still a further feature of the present invention that the wind rotor is constructed to automatically and rapidly come to a yaw position wherein the turbine sweeps the greatest area to the wind.

It is still a further teaching of the invention to provide a wind turbine which is of low initial cost and which requires minimum maintenance.

It is still a further feature of this invention to teach a wind turbine fabricated so that turbine yaw and speed control can be accomplished utilizing simple and inexpensive construction or mechanisms.

It is still a further teaching of this invention to provide a wind turbine which is designed to automatically operate on the downwind side of the support mechanism.

Other advantages and features of the present invention will become apparent by viewing the drawings herein taken in connection with the description thereof.

BRIEF DESCRIPTION OF THE DRAWINGS

FIG. 9 is a view of our wind turbine in its supported position and showing it in normal operation downwind of the support tower.

FIG. 10 is a top view of the wind turbine of FIG. 9 and shows wind-in-plane and out-of-plane velocities acting on the wind turbine blades as a result of a wind acting upon the wind turbine askewed to the wind turbine axis of rotation.

FIG. 11 is a representation of the wind turbine to illustrate the phenomenon of the generation of the yaw control moment thereof brought about by in-plane wind velocities acting upon the wind turbine.

FIG. 12 is a partial showing of a modified form of wind rotor.

DESCRIPTION OF THE PREFERRED EMBODIMENT

The current fuel shortage has renewed interest in wind turbines as power generating mechanisms in that they require no fuel, are non-polluting to the atmosphere, and are capable of being located in any location including remote locations which present fuel supply logistic problems. Despite these attractive advantages of a wind turbine, it is essential that the wind turbine be competitive with other power generating equipment both from an initial cost and a maintanence cost standpoint and that it be capable of operating with sufficient efficiency to produce the required power. The wind turbine must be of reasonable size, of simple construction, and readily and simply controllable both from a rotational speed and yaw standpoint.

We have found that a wind turbine fabricated from a two-bladed rotor having aerodynamic blades supported from the opposite ends of a flexible central beam member satisfies these requirements and the construction and advantages thereof will now be described.

Figure 1:
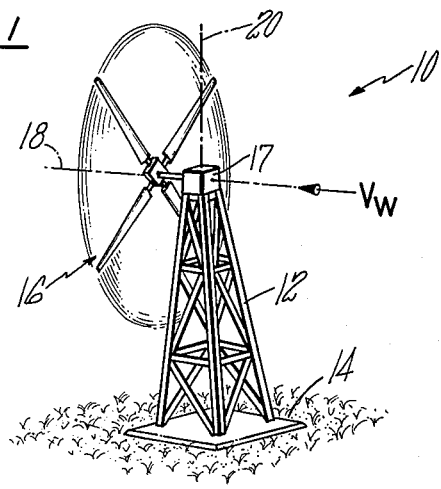
FIG. 1 is a perspective showing of our wind turbine supported from a support tower on the designed downwind side thereof.

Viewing FIG. 1 we see wind turbine device 10 which includes support mechanism 12, which is preferably a tower-like structure projecting from the earth surface 14. Wind turbine 16 is supported from support structure 12 so as to be rotatable about axis of rotation 18 and yaw axis 20. The wind turbine 16 is connected to support by a swivel or free-pivot connection 17 about yaw axis 20. Due to this free pivot connection between turbine 16 and support 12, turbine yaw moments are not transmitted to support 12. Wind turbine 16 is constructed so that during normal operation it will operate downwind of support tower 12 due to the natural tendency of a rotor to maintain a position perpendicular to the oncoming flow. Also, before rotation commences, initial wind speeds will cause the turbine to automatically weathervane to the downwind position.

While a four bladed turbine is shown in the FIG. 1 construction, it should be borne in mind that a turbine of any even number of blades may be fabricated from the construction taught herein. Wind turbine 16 is mechanically connected in conventional fashion to whatever mechanism it is intended to power but such connection is not shown since it forms no part of this invention.

Figure 2:
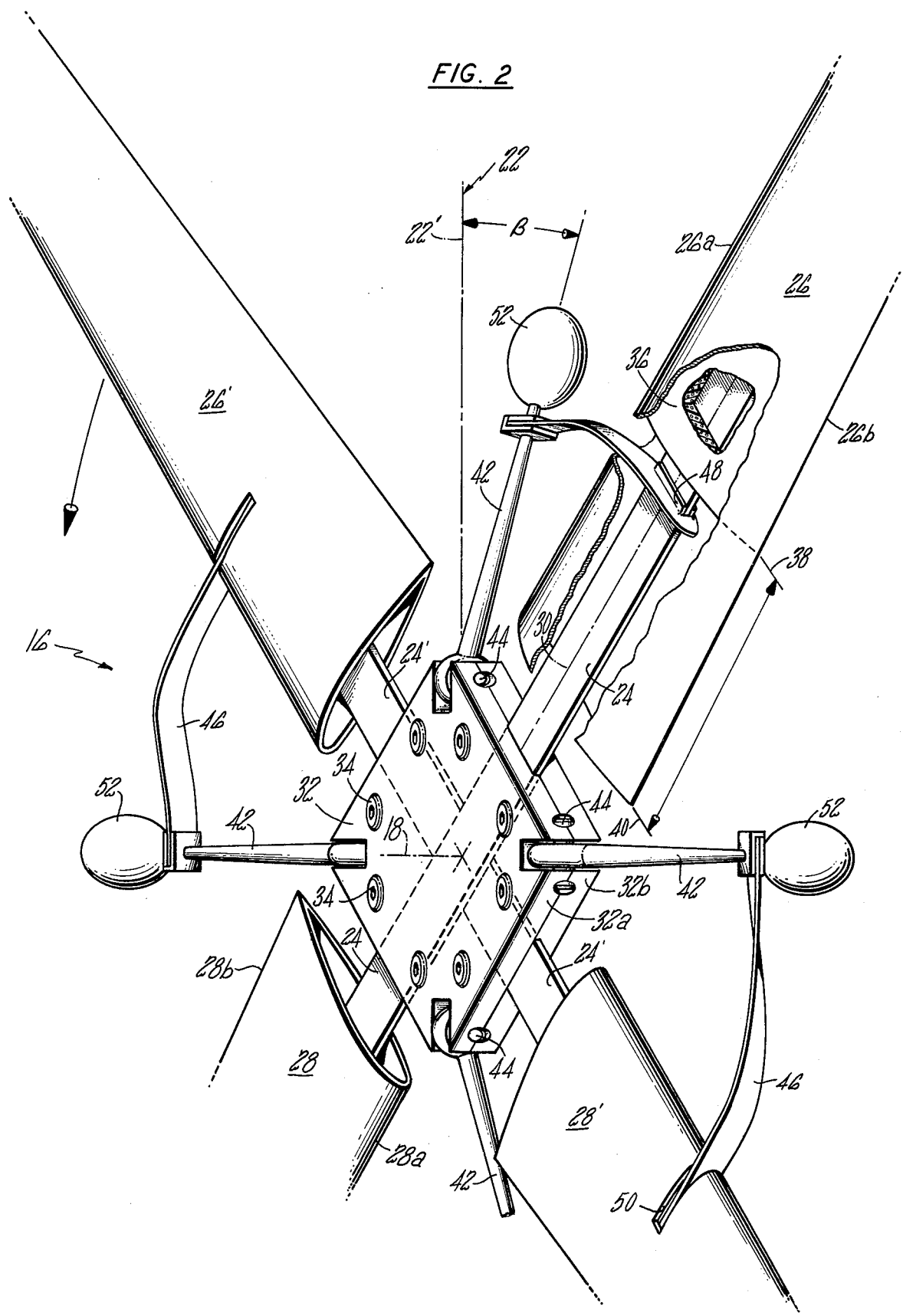
FIG. 2 is an enlarged perspective showing of our wind turbine to illustrate the structure of the preferred embodiment.

The construction of wind turbine 16 is shown in greater particularity in FIG. 2. While FIG. 2 depicts a four bladed turbine it should be borne in mind that turbine 16 could be of two, three, four, or any even number of blades following the teaching of this invention. The design lends itself most favorably to turbines having even number of blades by virtue of the simple blade retention system. However, odd numbers of blades can be employed but their retentions mechanism would be different. For purposes of description, systems with even numbers of blades will be considered henceforth herein. In describing FIG. 2, the construction of one of the two bladed systems will be described but it should be borne in mind that the other two bladed system is of precisely the same construction and stacked with respect thereto with equal circumferential spacing in the turbine plane of rotation 22, which is substantially perpendicular to axis of rotation 18. Turbine 16 consists of a central flexible member 24 which is beam shaped in construction and which passes through axis of rotation 18 and extends preferably equidistant on opposite sides thereof and which supports and carries blades, such as 26 and 28, at opposite ends thereof for rotation therewith about axis of rotation 18. Flexible beam member 24 is of composite construction fabricated from a plurality of unidirectional, high tensile strength fiber members, which may be made of carbon/epoxy, fiberglass, or other well-known high tensile strength fibers, and which are bonded together by a conventional curable adhesive, such as a plastic, to form flexible central member 24 to be of rectangular cross-section and of overall beam-shape. The construction of central flexible beam member is very important to this invention in that it is light in weight, yet has high tensile strength qualities so that it is capable of supporting rotor blades 26 and 28 at opposite ends thereof and to absorb all centrifugal force loads generated by the rotation thereof. In addition, beam 24 has a low shear modulus G, which permits torsional deflection or twisting of beam 24 about its torsional or twist axis 30, which is preferably centrally located within beam 24 and perpendicular to axis of rotation 18. The shear modulus G and cross sectional dimension of beam 24 should be chosen so as to permit significant torsional deflection or twisting of beam 24 about torsional axis 30 within allowable stresses. Spar 24, in view of this construction, also has an elasticity modulus E which will permit the beam and the blade which it supports to deflect, bend, or flap out of rotor plane 22 to produce the yaw control advantages to be described hereafter. Turbine hub 32 is preferably of two-piece construction including top half 32a and bottom half 32b which are joined in any conventional fashion such as by bolt members 34, and are contoured at their abutting surfaces to matingly receive central flexible members 24 and 24' in flat, perpendicular orientation so as to retain and support flexible members 24 and 24' for rotation therewith about axis 18. Blades 26 and 28 are airfoil shape and include leading edges 26a and 28a and trailing edges 26b and 28b. Blades 26 and 28 are preferably light weight shell members formed of bonded fiberglass cloth layers, or the like, and are supported from the opposite ends of flexible beam member 24 by any convenient method, or member 24 may extend to the tip of blade 26, as shown in U.S. Pat. No. 3,874,820, with foam filler 36 filling the chamber between beam 24 and the shell of blades 26 and 28.

It is important in this construction that the foam filler connecting blades 26 and 28 to the opposite ends of beam 24 terminate at station 38 so that the blade cover or shell is not bonded or otherwise connected to the flexible beam 24 between station 38 and 40 so that beam 24 is free to flex both torsionally about axis 30 and out-of-plane on either side of plane 22 between hub 32 and station 38, which is preferably 15 to 20 percent of the radius R of wind turbine 16.

The second beam 24' and blades 26' and 28' are identical in construction to beam 24 and blades 26 and 28. While FIG. 2 illustrates our preferred construction of wind turbine 16, it could also be constructed as shown in U.S. Pat. Nos. 3,484,174 or 3,874,820.

To control the pitch angle $\theta$ of blades 26 and 28 and hence the speed of turbine 16 for optimum performance, a weighted pendulum member 42 is pivotally suspended from hub 32 about pivot axis 44 so that, in static condition, that is with turbine 16 not rotating, pendulum members 42 are positioned out of rotor plane 22 by a selected angle $\beta$ and are connected to flexible beam 24 by strap members 46, which preferably envelope flexible beam 24 and is connected thereto in conventional fashion such as plate and bolt mechanism 48. Strap member 46 is rigid in its edgewise direction but flexible in flatwise direction to accommodate changes in the relative position of the blade and pendulum, due to its dimensions and enters blade 26 through cut-out 50. It should be noted that strap member 46 could as well be connected to blades 26 and 28 as to flexible beam 24.

One such pendulum member 42 is provided for each blade.

Pendulum member 42 performs the function of controlling the pitch angle θ of the blades and hence the speed of rotation of turbine 16 so that optimum turbine power generating efficiency is achieved. This speed control requirement and its importance will now be discussed.

Figure 3:
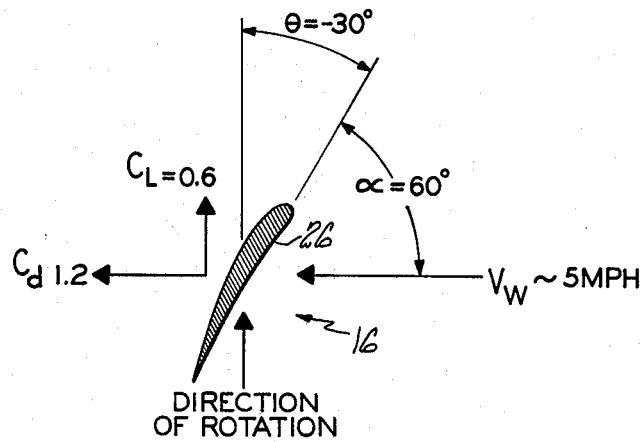
FIG. 3 is a representation of a blade of our wind turbine to illustrate its self-starting capabilities at wind start-up.

Viewing FIG. 3 we see blade 26 of wind turbine 16 in static condition. Since it is important that wind turbine 16 be self-starting, the turbine blades, such as 26, are set at a large negative pitch angle θ to enable significant accelerating force to be generated by a wind of minimum velocity. While the blade static pitch angle will vary in known fashion depending upon a blade twist and stall characteristics, the static blade pitch angle θ will normally be about −30°. In the FIG. 3 illustration, the wind has just commenced to act upon blade 26 as shown by wind vector $V_W$ at a wind velocity of about 5 mph. In the FIG. 3 illustration, the angle of attack α of the wind on blade 26 is 60° and is shown to produce a coefficient of lift $C_l$ on the blade of 0.6 and a coefficient of drag $C_d$ of 1.2. This marked difference between coefficient of lift $C_l$ and coefficient of drag $C_d$ is caused by the fact that in its static condition blade 26 is highly stalled, however, in view of the high pitch angle, blade 26 will commence to move and hence turbine 16 will commence to rotate. As the wind is increased from its zero velocity turbine static condition to 5 mph as shown in FIG. 3, turbine 16 begins to accelerate as a result of the lift produced on the blades as illustrated by $C_l$ in FIG. 3. As turbine rotational speed increases the blade angle of attack α changes from 60° to 15° (see FIG. 4) in view of the resultant wind velocity vectorially created by the actual wind velocity $V_w$ and the turbine speed due to rotation ΩR, where Ω is turbine rotational speed and r is the turbine radius at the blade station shown. By viewing FIG. 4, it would be noted that with the blade angle of attack reduced to 15°, the resulting life coefficient $C_l$ has been increased to 1.2 and thus a greater turbine accelerating force is produced and the turbine rpm continues to increase since the reduced angle of attack has brought blade 26 out of stall. As turbine rpm increases without changing pitch angle θ, as best shown in FIG. 5, the angle of attack α approaches zero and turbine 16 will stabilize at a low rpm and coefficient of lift and therefore achieve very poor performance.

Figure 6:
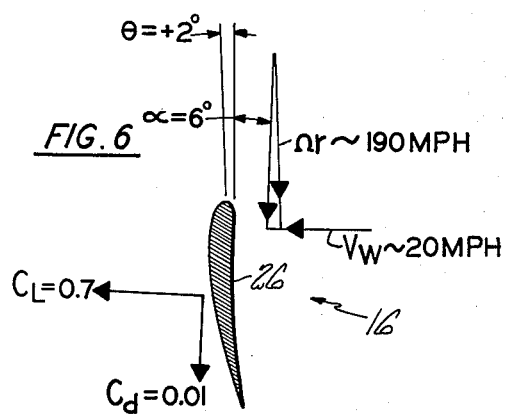
FIG. 6 is a representation of a blade of our wind turbine comparable to FIGS. 3, 4, and 5 but illustrating the rotational forces at the design operating condition showing the pitch angle after increasing from $-30°$ to $+2°$.
Figure 5:
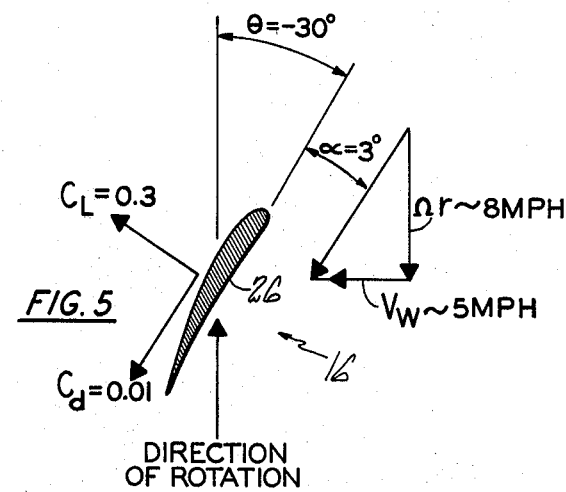
FIG. 5 is a representation of a blade of our wind turbine comparable to FIGS. 3 and 4 but illustrating the rotational forces which are imparted to our wind turbine by the wind following further wind turbine acceleration beyond the FIG. 4 condition.

To improve turbine performance, we must increase the turbine pitch angle θ and Ω beyond the FIG. 5 condition. Weighted pendulum member 42 is utilized and serves to bring the blade angle θ to about +2° at the design wind condition of 20 mph shown in FIG. 6.

Figure 7:
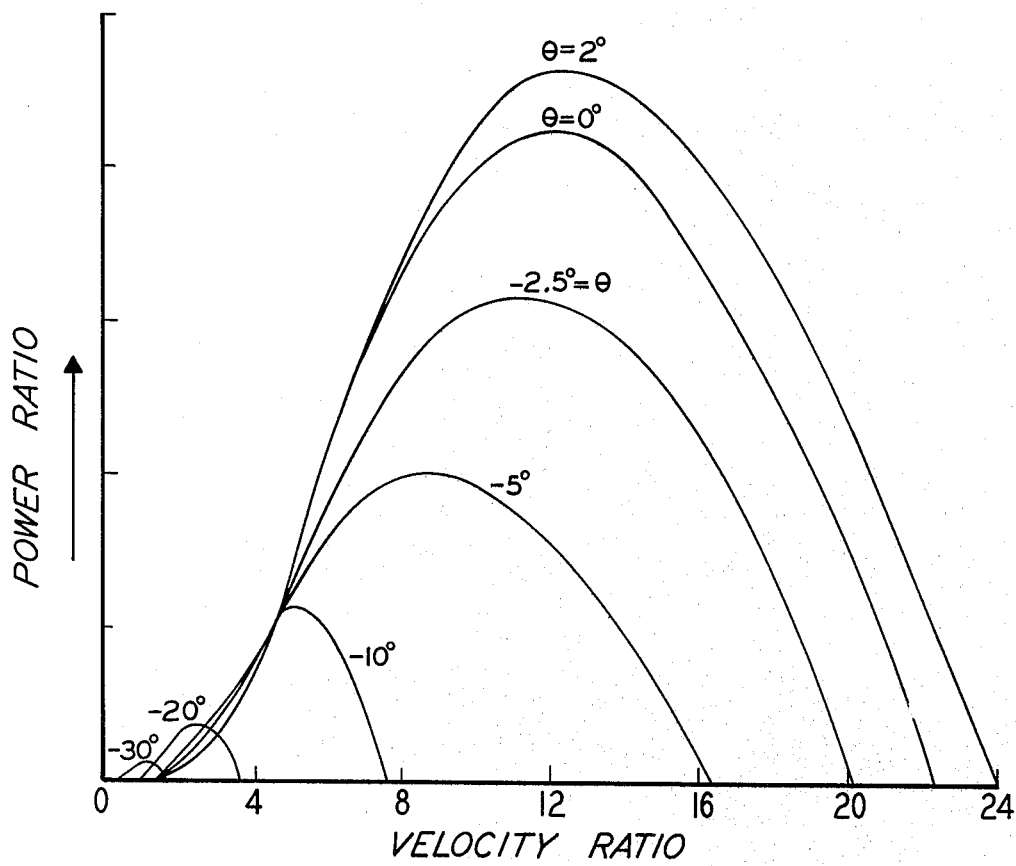
FIG. 7 is a graph of Power Ratio plotted against Velocity Ratio for a typical wind turbine and illustrating the importance of blade pitch angle $\theta$ and turbine rpm to wind turbine power generation.

It can be shown by the graph illustrated in FIG. 7 that turbine performance is maximum when the blade pitch angle θ is near +2°. It will be noted by viewing FIG. 7 that in the FIGS. 3, 4, and 5 condition, with blade pitch angle at −30°, the performance of turbine 16 is very poor, whereas with the blade pitch angle θ at about +2°, the turbine performance is maximum.

In FIG. 7, power ratio is power generated, P, divided by the power available in the wind column defined by the turbine disc area, P.R. = $P/\tfrac{1}{2}\rho\pi R^2 V_w^3$, where ρ is air density, R is turbine radius, and $V_w$ is wind speed, and velocity ratio is blade tip velocity divided by wind velocity. The graph of FIG. 7 shows that for optimum wind turbine performance variable pitch angle θ and turbine rpm is necessary.

Figure 8:
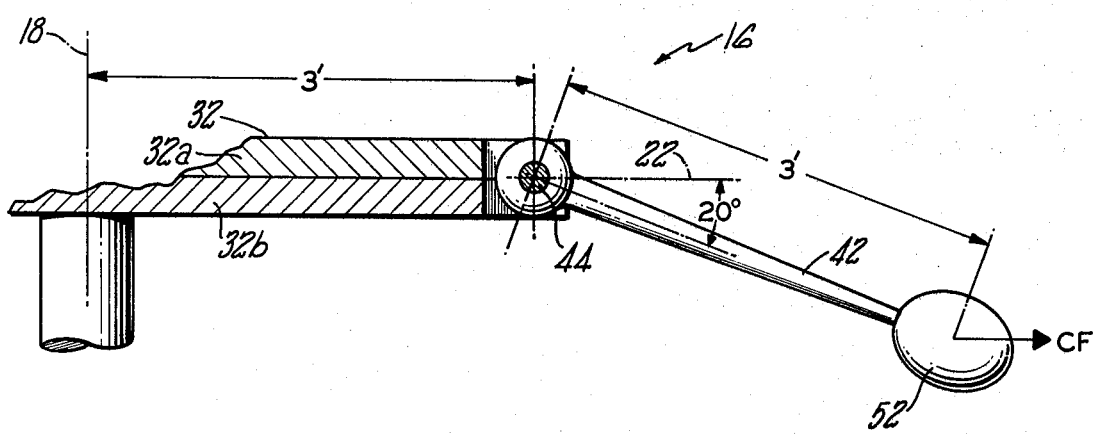
FIG. 8 shows the preferred dimensional relationship between the wind turbine and its speed control pendulum member.

Pendulum members 42 serve to perform this pitch angle and turbine speed control function and the construction and operation thereof will now be described by viewing FIG. 8. As previously described, pendulum member 42 is pivotally supported about pivot axis 44 from turbine hub 32 so that at equilibrium, that is, when turbine 16 is not rotating, pendulum 42 forms a selected angle β with line 22' in turbine plane 22. Pendulum 42 preferably carries a mass 52 at its outer end so that, as turbine 16 rotates about axis 18, pendulum 42 reacts to centrifugal force and pivots about axis 44 to move toward turbine plane 22. In view of the fact that pendulum 42 is connected to flexible beam 24 by strap 46, this motion of pendulum 42 will cause flexible beam 24 to twist about its torsional axis 30, carrying blades 26 and 28 therewith, in a direction and in an amount to increase the blade pitch angle θ from about −30° to about +2°. While centrifugal force tends to bring pendulum 42 into rotor plane 22 (β=0°), this is never quite achieved because as the centrifugal force imposed motion on pendulum 42 causes flexible beam 24 to twist about its torsional axis 30, such displacement of beam 24 from its normal position produces a beam restoring moment which will balance the pendulum imposed twisting moment at a position short of 0° β angle. However, by proper selection of pendulum weight and dimension characteristics, and its angular offset from the rotor plane, this equilibrium blade pitch angle can be predetermined to provide optimum performance depending upon the torsional spring characteristic of beam 24, i.e., the thickness, shear modulus, and length for our flexible beam 24. It is important that pendulum member 42 be supported from some place other than one of the blades so as to avoid 1/rev frequency excitation problems. Further, the geometry and mass of pendulum 42 must be selected to produce a pendulum frequency substantially above the natural torsional frequency of the blade, which is slightly above 1/rev. Pendulum 42 should therefore have a frequency of 1.5/rev or above so as not to couple with flatwise blade bending and thereby cause blade instability.

Our experience has been that for a wind turbine of this construction having a diameter of 45 feet, pivot axis 44 should be displaced about three feet from axis 18, and the center of pendulum mass 52 should be displaced about three feet from axis 44, and the equilibrium angle β of pendulum 42 should be about 20°. The pendulum static angle is, of course, larger than the pendulum design operating angle. For example, we use a pendulum static angle of −45° to produce the preferred pendulum operating angle of −10° to −20°. These dimensions and characteristics prove to perform efficiently for the typical wind turbine of the 15 kilowatt size and of 45 foot diameter. We have also found that the optimum dimensions of our flexible beam member 24 when fabricated of graphite/epoxy is 3.5 feet in length between hub 32 and station 38, 6 inches in width in plane 22, and 0.7 inches in thickness normal to plane 22.

Our experience also shows that the flexible beam moment, that is the moment necessary to cause beam 24 to torsionally twist about axis 30, is about 513 foot-pounds utilizing the formula G J θ/L, where G equals shear modulus, where J equals torsional moment of inertia, where θ is blade pitch angle, and where L is the length of flexible beam member 24 taken between the hub 32 and blade stations 38 as shown in FIG. 2.

As previously stated, it is an important feature and requirement of the wind turbine taught herein that it be yaw responsive to wind direction changes so as to bring the turbine perpendicular to the wind as quickly as possible to insure optimum performance. This yaw control characteristic of our wind turbine will best be understood by viewing FIGS. 9, 10, and 11. As best shown in FIG. 9, rotor 16 is supported from support mechanism 12 so as to operate downwind of support tower 12 and to rotate in a counter-clockwise direction about axis of rotoation 18. Diametrically opposed blades 26 and 28 will be considered for this description. Now viewing FIG. 10, let us consider that wind turbine 16 is in the position shown therein and the wind either commences to blow or shifts so as to establish a wind velocity $V_w$ as shown askew to turbine axis 18. This wind velocity $V_w$ can be broken up into in-plane velocity components $V_w \sin \phi$ and out-of-plane velocity components $V_w \cos \phi$, where $\phi$ is the angle between axis 18 and wind direction which is called the turbine angle of attack. By viewing FIG. 10, it will be evident that out-of-plane velocity component $V_w \cos \phi$ will act upon all blades identically and thereof will have no effect on yaw control. This is not so of wind velocity component $V_w \sin \phi$ since it will be noted by viewing FIG. 10 that blade 26 is moving in an opposite direction to wind velocity vector $V_w \sin \phi$, while diametrically opposed blade 28 is moving in the same direction as wind velocity vector $V_w \sin \phi$. The effect of this phenomenon is best understood by viewing FIG. 11 wherein the new wind velocity felt by blade 26 is the sum of wind velocity $V_w \sin \phi$ and blade velocity due to rotation $\Omega R$. It will also be noted that the net wind velocity acting upon blade 28 is the difference between the blade rotational velocity $\Omega R$ and the wind velocity vector $V_w \sin \phi$. Since the lift generated by each blade is a function of this net wind velocity, since net wind velocity determines the dynamic pressure acting on the blade, the lift establishing force felt by blade 26 experiences a positive increment of lift force, while blade 28 experiences a negative increment of lift force, thereby establishing different lift between blades 26 and 28. In view of this differential lift acting upon blades 26 and 28, and in view of the dynamic lag experienced by rotating blades subject to aerodynamic excitation, blade 28, having less lift at $\psi = 0$ deflects toward the tower as shown in phantom in FIG. 11. Conversely, blade 26, having higher lift deflects away from the tower. The net effect is to produce a yaw moment on turbine 26 which will rapidly bring the turbine into a position wherein the rotor axis of rotation 18 is parallel to the wind velocity $V_w$, in which position the in-plane wind velocity vector $V_w \sin \phi$ experienced by turbine 16 is zero. It will therefore be seen that wind turbine 16 is so constructed that it will yaw away from turbine angle of attack change, tending to reduce $\phi$ to zero.

Initial alignment of turbine 16 to the wind at wind start-up and before turbine 16 begins to rotate is achieved by simple weathervaning since the turbine is designed to operate downstream of the tower 12. If the turbine 16 happened to be upstream of the tower 12 at the time that the wind commenced blowing, the drag of the system would bring the turbine around toward the downstream side of the tower so that the yawing moment previously described would be brought into play.

Figure 4:
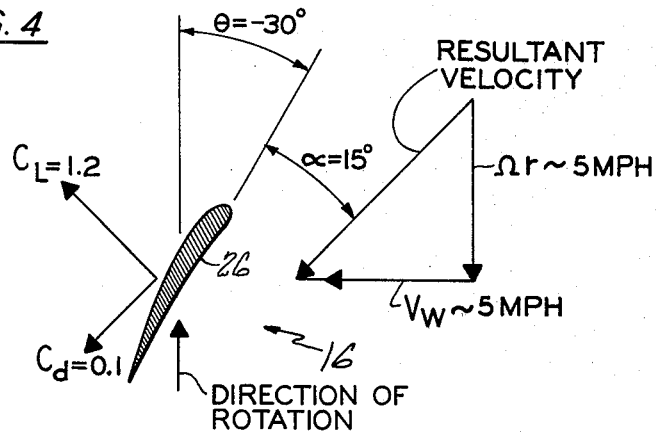
FIG. 4 is a representation of a blade of our wind turbine comparable to FIG. 3 but illustrating the rotational forces generated thereon by the wind after the wind turbine has commenced rotating.

Our wind turbine is designed for optimum performance when the wind velocity is about 15 to 25 mph and over, at which time the blade pitch angle is about zero or preferably about +2°, but it should be borne in mind that our wind turbine will also operate properly, although less efficiently, at blade pitch angles in the FIGS. 3, 4, and 5 range if there is less wind velocity than design wind velocity. Under these latter conditions our wind turbine will still generate power but will not be as efficient as at the design operating condition.

While in our preferred embodiment, beam 24 is a rectangular cross section and passes through turbine axis of rotation 18, those skilled in the art will appreciate that beam 24 may be of different cross sectional shape, such as oval, and may not pass through axis of rotation 18, but instead, an individual flexible beam member 24 may be provided for each blade and connected to hub 32 in conventional fashion, such as by bolting as shown in FIG. 12, and will still operate utilizing the control mechanisms disclosed herein.

We wish it to be understood that we do not desire to be limited to the exact details of construction shown and described, for obvious modifications will occur to a person skilled in the art.

We claim:

1. A wind turbine device adapted to be wind driven to generate power and including:
   (A) support means adapted to support a wind turbine,
   (B) a wind turbine,
   (C) means to connect said wind turbine to said support means for rotation about an axis of rotation in a plane of rotation downward thereof and for yaw rotation about a free-pivot connection between the wind turbine and the support means,
   (D) said wind turbine including:
      (1) a flexible beam member passing through the turbine axis of rotation and extendng on opposite sides thereof and fabricated to have high tensile strength and torsional flexibility about the beam member torsional axis normal to the axis of rotation,
      (2) two airfoil blades mounted on said flexible beam member to extend from opposite ends thereof for rotation therewith and for torsional flexing therewith and shaped to produce a high negative static pitch angle with the wind turbine plane-of-rotation sufficient to permit wind turbine self-starting in response to minimal initial wind flow, and
   (E) turbine speed control means comprising a pendulum member pivotally connected to the wind turbine so as to form a selected angle with the turbine plane-of-rotation when static, and connected to the flexible beam member of each blade so as to be centrifugally responsive to rotor speed to torsionally twist the flexible beam member to maintain the blade pitch angle near 0° throughout the wind turbine design operating range.

2. A wind turbine device according to claim 1 wherein said flexible beam member is fabricated from uni-directional composite material of high tensile strength and extending parallel to the beam member torsional axis to form a beam member having low shear modulus to permit torsional deflection of the beam member about its torsional axis to thereby vary blade pitch angle.

3. A wind turbine device according to claim 2 wherein the flexible beam member is fabricated so that its shear modulus is such that a beam member static position restoring moment is created by the torsional deflection of the beam member by the turbine speed control means so that a beam member, blade, and pendulum equilibrium position is achieved throughout the wind turbine operating range and when the blade pitch angle is about zero degrees at wind turbine design operating range.

4. A wind turbine device adapted to be wind driven to generate power and including:
(A) support means adapted to support a wind turbine,
(B) a wind turbine,
(C) means to connect said wind turbine to said support means for rotation about an axis of rotation in a plane of rotation downward thereof and for yaw rotation about a free-pivot connection between the wind turbine and the support means,
(D) said wind turbine including:
  (1) a flexible beam member passing through the turbine axis of rotation and extending on opposite sides thereof and fabricated to have high tensile strength and torsional flexibility about the beam member torsional axis normal to the axis of rotation,
  (2) two airfoil blades mounted on said flexible beam member to extend from opposite ends thereof for rotation therewith and for torsional flexing therewith and shaped to produce a high negative static pitch angle with the wind turbine plane-of-rotation sufficient to permit wind turbine self-starting in response to minimal initial wind flow, and
(E) turbine speed control means comprising a pendulum member pivotally connected to the wind turbine so as to form a selected angle with the turbine plane-of-rotation when static, and connected to the flexible beam member of each blade so as to be centrifugally responsive to rotor speed to torsionally twist the flexible beam member to maintain the blade pitch angle near 0° throughout the wind turbine design operating range, wherein said flexible beam member is fabricated from uni-directional composite material of high tensile strength and extending parallel to the beam member torsional axis to form a beam member having low shear modulus to permit torsional deflection of the beam member about its torsional axis to thereby vary blade pitch angle, and wherein the wind turbine diameter is about 45 feet and including a turbine hub mounted for rotation about said wind turbine axis of rotation and supporting said flexible beam member and blades for rotation therewith, means pivotally connecting said pendulum member to said hub at a station about three feet from said axis of rotation, wherein said pendulum member has an effective mass of about 20 pounds positioned about three feet from its pivot connection to the hub, and wherein the pendulum member static angle with respect to the rotor plane of rotation is about −45° and the pendulum design operating angle is about −10° to −20°.

5. A wind turbine device according to claim 4 wherein said flexible beam member is fabricated from bonded, uni-directional fibers or rovings of carbon-/epoxy or fiberglass and shaped to be of rectangular cross sectional shape having a width of about 6 inches in the wind turbine plane of rotation and a thickness of about 0.7 inches normal to the wind turbine plane of rotation, and having a free flexing length dimension of about 3.5 feet between its point of support from the hub and its connection to the blade and so as to have a low shear modulus to permit torsional deflection or twisting of the flexible beam member about its torsional axis parallel to its uni-directional fibers in response to a twisting moment of about 513 foot pounds imposed thereon by said pendulum member at design operation.

6. A wind turbine according to claim 1 wherein said pendulum member is fabricated to have a natural frequency of 1.5/rev or above.

7. A wind turbine device adapted to be mounted so as to be wind-driven to generate power and including:
(A) a wind turbine,
(B) a wind turbine support mechanism,
(C) means connecting said wind turbine to said support mechanism for rotation about an axis of rotation in a plane of rotation substantially perpendicular thereto and for free pivot motion about a turbine yaw axis, and
(D) said wind turbine including:
  (1) a flexible beam member extending through and on opposite sides of the axis of rotation and fabricated to be of high tensile strength and flexible to permit torsional deflections of the blade and moderate out-of-plane deflections,
  (2) two airfoil shaped blade members connected to said flexible beam member on the opposite sides of the axis of rotation and shaped so that wind acting thereagainst from a direction askew to the turbine axis of rotation will cause turbine rotation and establish in-plane wind velocity algebraically flexible beam member about its torsional axis parallel to its uni-directional fibers in response to a twisting moment of about 513 foot pounds imposed thereon by said pendulum member at design operation, wherein said flexible beam member is further fabricated to be torsionally flexible about the beam member torsional or twist axis normal to the axis of rotation, wherein said blades are supported from said flexible beam member to produce a high negative static pitch angle with the wind turbine plane-of-rotation sufficient to permit wind turbine self-starting in response to minimal initial wind flow, and including turbine speed control means comprising a pendulum member pivotally connected to the wind turbine so as to form a selected angle with the turbine plane-of-rotation when static, and connected to the flexible beam member of each blade so as to be centrifugally responsive to rotor speed to torsionally twist the flexible beam member to maintain the blade pitch angle near 0° throughout the wind turbine design operating range, and wherein the wind turbine diameter is about 45 feet and including a turbine hub mounted for rotation about said wind turbine axis of rotation and supporting said flexible beam member and blades for rotation therewith, means pivotally connecting said pendulum member to said hub at a station about three feet from said axis of rotation, wherein said pendulum member has an effective mass of about 20 pounds positioned about three feet from its pivot connection to the hub, and wherein the pendulum member static angle with respect to the rotor plane of rotation is about −45° and the pendulum design operating angle is about −10° to −20°.

8. A wind turbine device according to claim 7 wherein said flexible beam member is fabricated from bonded, uni-directional fibers or rovings of carbon-/epoxy or fiberglass and shaped to be of rectangular cross sectional shape having a width of about 6 inches in the wind turbine plane of rotation and a thickness of about 0.7 inches normal to the wind turbine plane of rotation, and having a free flexing length dimension of about 3.5 feet between its point of support from the hub and its connection to the blade and so as to have a low shear modulus to permit torsional deflection or twisting of the flexible beam member about its torsional axis parallel to its uni-directional fibers in response to a twisting moment of about 513 foot pounds imposed thereon by said pendulum member.

9. A wind turbine device adapted to be wind driven to generate power and including:
 (A) support means adapted to support a wind turbine,
 (B) a wind turbine,
 (C) means to connect said wind turbine to said support means for rotation about an axis of rotation in a plane of rotation downward thereof and for yaw rotation about a free-pivot connection between the wind turbine and the support means,
 (D) said wind turbine including:
  (1) flexible beam members extending on opposite sides of the turbine axis of rotation and fabricated to have high tensile strength and torsional flexibility about a torsional axis normal to the axis of rotation,
  (2) an airfoil blade mounted on each of said flexible beam members to extend for rotation therewith and for torsional flexing therewith and shaped to produce a high negative static pitch angle with the wind turbine plane-of-rotation sufficient to permit wind turbine self-starting in response to minimal initial wind flow, and
 (E) turbine speed control means comprising a pendulum member pivotally connected to the wind turbine so as to form a selected angle with the turbine plane-of-rotation when static, and connected to the flexible beam member of each blade so as to be centrifugally responsive to rotor speed to torsionally twist the flexible beam member to maintain the blade pitch angle near 0° throughout the wind turbine design operating range.

10. A wind turbine device according to claim 9 and wherein said flexible beam members are further fabricated to be torsionally flexible about the beam member torsional or twist axis normal to the axis of rotation, wherein said blades are supported from said flexible beam members to produce a high negative static pitch angle with the wind turbine plane-of-rotation sufficient to permit wind turbine self-starting in repsonse to minimal initial wind flow, and including turbine speed control means comprising a pendulum member pivotally connected to the wind turbine so as to form a selected angle with the turbine plane-of-rotation when static, and connected to the flexible beam member of each blade so as to be centrifugally responsive to rotor speed to torsionally twist the flexible beam member to maintain the blade pitch angle near 0° throughout the wind turbine design operating range.

* * * * *